United States Patent
Isokawa (10) Patent No.: US 10,490,223 B2
(45) Date of Patent: Nov. 26, 2019

(54) MAGNETIC DISK DEVICE AND REFRESH PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Hiroshi Isokawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/104,831

(22) Filed: Aug. 17, 2018

(65) Prior Publication Data

US 2019/0198054 A1  Jun. 27, 2019

(30) Foreign Application Priority Data

Dec. 27, 2017  (JP) .................. 2017-251062

(51) Int. Cl.
*G11B 5/09* (2006.01)
*G11B 20/18* (2006.01)

(52) U.S. Cl.
CPC ............... *G11B 20/18* (2013.01); *G11B 5/09* (2013.01)

(58) Field of Classification Search
None
See application file for complete search history.

(56) References Cited

U.S. PATENT DOCUMENTS

| 6,809,893 | B2 | 10/2004 | Uzumaki et al. |
| 6,987,630 | B1 | 1/2006 | Higgins et al. |
| 9,047,924 | B1 * | 6/2015 | Kawai ............... G11B 5/012 |
| 9,099,155 | B1 * | 8/2015 | Kataria ............... G11B 27/36 |
| 9,129,658 | B1 | 9/2015 | Yamamoto |
| 9,430,339 | B1 * | 8/2016 | Song .................. G11C 16/3495 |
| 9,524,790 | B1 * | 12/2016 | Steiner .............. G11C 11/5642 |
| 9,620,220 | B2 * | 4/2017 | Zhao ..................... G11C 16/10 |
| 2001/0010603 | A1 * | 8/2001 | Uzumaki ......... G11B 20/10009 |
| | | | 360/31 |
| 2006/0221476 | A1 * | 10/2006 | Ueno .................... G11B 19/04 |
| | | | 360/25 |
| 2008/0198492 | A1 * | 8/2008 | Ahn ................... G11B 20/1816 |
| | | | 360/31 |

(Continued)

FOREIGN PATENT DOCUMENTS

JP  2007-087490 A  4/2007

*Primary Examiner* — Peter Vincent Agustin
(74) *Attorney, Agent, or Firm* — Kim & Stewart LLP (57) ABSTRACT

According to one embodiment, a magnetic disk device includes a disk, a head that writes data to the disk and reads data from the disk, and a controller. The controller is configured to read first data written on the disk, measure a first read error rate of the first data, determine a difference in the first read error rate from a previously determined read error rate of the first data, determine a current read error rate for second data written on the disk based on the difference in the first read error rate from the previously determined read error rate, and determine whether a refresh process is performed on the second data based on the current error rate.

5 Claims, 10 Drawing Sheets

(56) References Cited

U.S. PATENT DOCUMENTS

| | | | |
|---|---|---|---|
| 2010/0188767 A1* | 7/2010 | Hirose | G11B 5/09 360/31 |
| 2014/0071559 A1* | 3/2014 | Toda | G11B 20/1879 360/55 |
| 2017/0005838 A1* | 1/2017 | Dziak | H04L 25/03019 |

* cited by examiner

| Track No. | WRITE COUNT |
|---|---|
| ⋮ | ⋮ |
| Track (N-2) | 5 |
| Track (N-1) | 9 |
| Track N | 10 |
| Track (N+1) | 8 |
| Track (N+2) | 4 |
| ⋮ | ⋮ |

| Track No. | | WRITE COUNT |
|---|---|---|
| ⋮ | | ⋮ |
| Track (N-2) | INSIDE | 8 |
| | OUTSIDE | 5 |
| Track (N-1) | INSIDE | 7 |
| | OUTSIDE | 6 |
| Track N | INSIDE | 7 |
| | OUTSIDE | 10 |
| Track (N+1) | INSIDE | 5 |
| | OUTSIDE | 8 |
| Track (N+2) | INSIDE | 5 |
| | OUTSIDE | 4 |
| ⋮ | | ⋮ |

CTB

FIG.13

MAGNETIC DISK DEVICE AND REFRESH PROCESSING METHOD

CROSS-REFERENCE TO RELATED APPLICATIONS

This application is based upon and claims the benefit of priority from Japanese Patent Application No. 2017-251062, filed Dec. 27, 2017, the entire contents of which are incorporated herein by reference.

FIELD

Embodiments described herein relate generally to a magnetic disk device and a refresh processing method.

BACKGROUND

When a magnetic disk device is exposed to thermal fluctuations, such as a high temperature environment, data stored in the disk device may be corrupted or otherwise degraded. When the magnetic disk device reads such degraded data, signal quality of the read data may also be compromised. When degraded data is detected, the magnetic disk device executes a process of rewriting degraded data (such as a refresh process). However, when the magnetic disk device is reactivated after a sudden power loss occurs and while the magnetic disk device is exposed to thermal fluctuations, it is difficult for the magnetic disk device to detect data degraded by the thermal fluctuations. In the magnetic disk device, it is necessary to read all data in the disk and evaluate the read data in order to detect data degraded by thermal fluctuations. For that reason, when a large quantity of data are stored by the disk, the magnetic disk device performs a time-consuming process to detect data degraded by the thermal fluctuations.

DETAILED DESCRIPTION

Embodiments provide a magnetic disk device and a refresh process that improves reliability of data stored in the magnetic disk device.

In general, according to one embodiment, a magnetic disk device includes a disk, a head that writes data to the disk and reads data from the disk, and a controller. The controller is configured to read first data written on the disk, measure a first read error rate of the first data, determine a difference in the first read error rate from a previously determined read error rate of the first data, determine a current read error rate for second data written on the disk based on the difference in the first read error rate from the previously determined read error rate, and determine whether a refresh process is performed on the second data based on the current error rate.

Hereinafter, embodiments will be described with reference to the accompanying drawings. The drawings are merely examples and do not limit the scope of the herein-described embodiments.

First Embodiment

Figure 1:
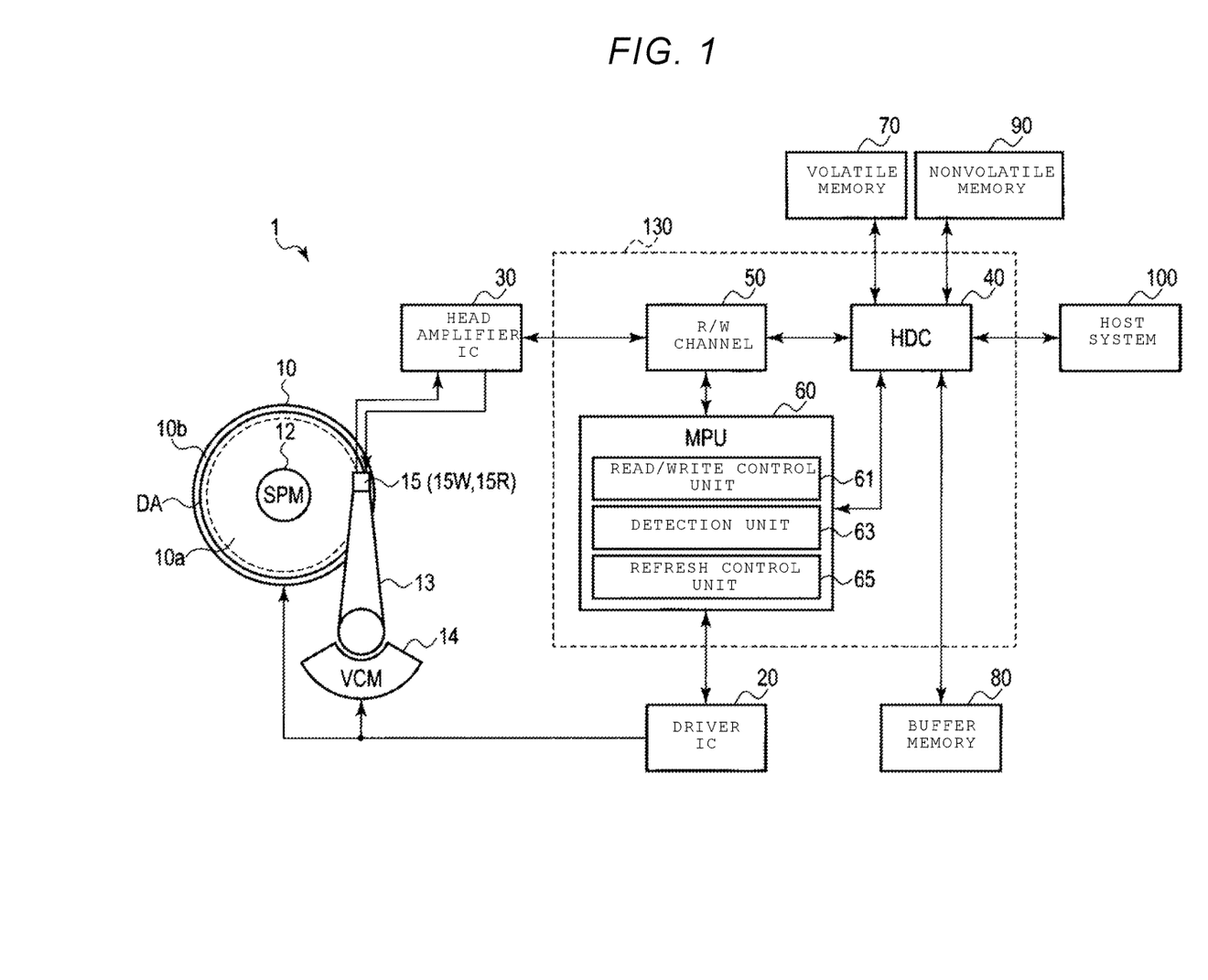
FIG. 1 is a block diagram illustrating a configuration of a magnetic disk device according to a first embodiment.

FIG. 1 is a block diagram illustrating a configuration of a magnetic disk device 1 according to a first embodiment.

The magnetic disk device 1 includes a head disk assembly (HDA), a driver IC 20, a head amplifier integrated circuit (hereinafter, referred to as a head amplifier IC or preamplifier) 30, a volatile memory 70, a buffer memory (buffer) 80, a nonvolatile memory 90, and a system controller 130, which can be integrated circuit of one chip and is described later. The magnetic disk device is connected to a host system (hereinafter, simply referred to as a host) 100.

The HDA includes a magnetic disk (hereinafter, referred to as a disk) 10, a spindle motor (hereinafter, referred to as an SPM) 12, an arm 13 on which a head 15 is mounted, and a voice coil motor (hereinafter, referred to as a VCM) 14. The disk 10 is attached to the spindle motor 12 and is rotated by the spindle motor 12. The arm 13 and the VCM 14 constitute an actuator. The actuator controls movement of the head 15 mounted on the arm 13 to a target position on the disk 10 by driving the VCM 14. The magnetic disk device 1 can include two or more disks 10 and, for each disk 10, a corresponding head 15.

A recording area of the disk 10 includes a user data area 10a usable by a user and a system area 10b used for writing information necessary for system management. In an example illustrated in FIG. 1, the system area 10b includes a detection area DA. The detection area DA may be disposed in the user data area 10a.

The head 15 is provided with a write head 15W and a read head 15R mounted on a slider. The write head 15W writes data onto the disk 10. The read head 15R reads data recorded in a data track on the disk 10.

A driver IC 20 controls driving of the SPM 12 and the VCM 14 as controlled by a system controller 130 (more specifically, an MPU 60, which is described below).

A head amplifier IC (preamplifier) 30 includes a read amplifier and a write driver. The read amplifier amplifies a read signal read from the disk 10 and outputs the read signal to a system controller 130 (specifically, a read/write (R/W)

channel 50, described below). The write driver outputs a write current in accordance with write data output from the R/W channel 50 to the head 15.

A volatile memory 70 is a semiconductor memory in which stored data is lost when power supplied to the magnetic disk device 1 is cut off. The volatile memory 70 stores data and the like necessary for processes performed by components of the magnetic disk device 1. The volatile memory 70 is, for example, a dynamic random access memory (DRAM) or a synchronous dynamic random access memory (SDRAM).

A buffer memory 80 is a semiconductor memory that temporarily records data and the like communicated between the magnetic disk device 1 and a host 100. The buffer memory 80 may be formed integrally with the volatile memory 70. The buffer memory 80 is, for example, a DRAM, a static random access memory (SRAM), a ferroelectric random access memory (FeRAM), a magnetoresistive random access memory (MRAM), or the like.

A nonvolatile memory 90 is a semiconductor memory that keeps stored data even when power supplied to the magnetic disk device 1 is cut off. The nonvolatile memory is, for example, a NOR type or NAND type flash ROM (read only memory) (FROM).

The system controller (controller) 130 is implemented, for example, as a large scale integrated circuit (LSI), called a System-on-a-Chip (SoC), in which a plurality of elements are integrated on a single chip. The system controller 130 includes a hard disk controller (HDC) 40, a read/write (R/W) channel 50, and a microprocessor (MPU) 60. The system controller 130 is electrically connected to the driver IC 20, the head amplifier IC 30, the volatile memory 70, the buffer memory 80, the nonvolatile memory 90, and the host system 100.

The HDC 40 controls data transfer between the host 100 and the R/W channel 50 according to an instruction from the MPU 60 to be described later. The HDC 40 is electrically connected to the R/W channel 50, the MPU 60, the volatile memory 70, the buffer memory 80, the nonvolatile memory 90, and the like.

The R/W channel 50 executes signal processing of read data and write data according to the instruction from the MPU 60 to be described later. The R/W channel 50 has a circuit or a function for measuring signal quality of read data. The R/W channel 50 is electrically connected to the head amplifier IC 30, the HDC 40, the MPU 60, and the like.

The MPU 60 is a main controller that controls each component of the magnetic disk device 1. The MPU 60 controls the VCM 14 via the driver IC 20 and executes servo control for positioning the head 15. The MPU 60 controls a write operation of writing data to the disk 10 and selects a save destination of write data transferred from the host 100. The MPU 60 controls a read operation of reading data from the disk 10 and controls processing of read data transferred from the disk 10 to the host 100. The MPU 60 is connected to each component of the magnetic disk device 1. For example, the MPU 60 is electrically connected to the driver IC 20, the HDC 40, and the R/W channel 50.

The MPU 60 includes a read/write control unit 61, a detection unit 63, and a refresh control unit 65. The MPU 60 implements execution of these units on firmware, for example, the read/write control unit 61, the detection unit 63, the refresh control unit 65, and the like. In some embodiments, the MPU 60 may implement these units as circuits.

The read/write control unit 61 controls data read operations and data write operations according to a command or commands from the host 100. In so doing, the read/write control unit 61 controls the VCM 14 via the driver IC 20, positions the head 15 at a target position on the disk 10, and reads or writes data.

The read/write control unit 61 writes data (hereinafter, referred to as "detection data") which is easily degraded (attenuated or reduced in signal quality) by exposure to thermal fluctuations in a detection area DA. That is, the detection data are data that are easily degraded when the magnetic disk device 1 is located in an environment (hereinafter, referred to as thermal fluctuation environment) in which thermal fluctuations such as a high temperatures, are likely to occur. The thermal fluctuations are a phenomenon in which a magnetization direction of magnetic particles are more freely reversed in polarity by thermal energy. In other words, the read/write control unit 61 writes data that is easily degraded by the thermal fluctuations associated with a high temperature environment, for example, an environment that is elevated several tens of degrees in the detection area DA. For example, the detection data is data including a lot of low frequency data patterns (hereinafter, referred to as a low frequency pattern) having a large magnetization inversion interval as compared with data (hereinafter, referred to as normal data) which randomly includes data patterns of various magnetization inversion intervals. The detection data may be data that include the lowest frequency patterns among the data patterns included in the normal data, for example, data including a significant number of magnetization inversion intervals that are several time larger that the magnetization inversion intervals included in the normal data. The detection data may be data of a low frequency pattern, for example, a data pattern of a single frequency lowest frequency among data patterns included in the normal data. For example, the read/write control unit 61 writes the normal data in a recording area other than the detection area DA of the disk 10, and rewrites the detection data in the detection area DA at a predetermined time or at predetermined time intervals. Alternatively, the detection data may be written in the detection area DA at the time of manufacture.

The read/write control unit 61 reads the detection data written in the detection area DA at a predetermined time. For example, the read/write control unit 61 reads the detection data written in the detection area DA at a time when the magnetic disk device 1 is idle. The read/write control unit 61 reads the detection data written in the detection area DA when the magnetic disk device 1 stops its operation (hereinafter, this may be simply referred to as "stoppage"), when the magnetic disk device 1 is activated (hereinafter, this may be simply referred to as "startup"), at the time immediately after writing the detection data in the detection area DA, and/or at other suitable times. The read/write control unit 61 may periodically read the detection data even at times other than the predetermined times described above.

Figure 2:
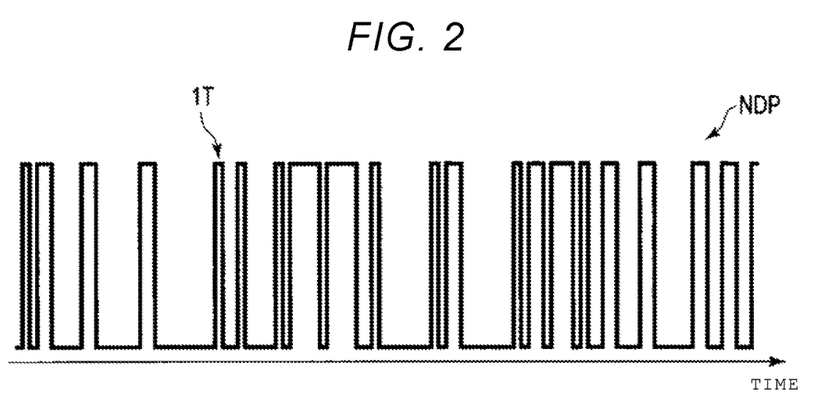
FIG. 2 is a schematic diagram illustrating an example of a data pattern of normal data.
Figure 3:
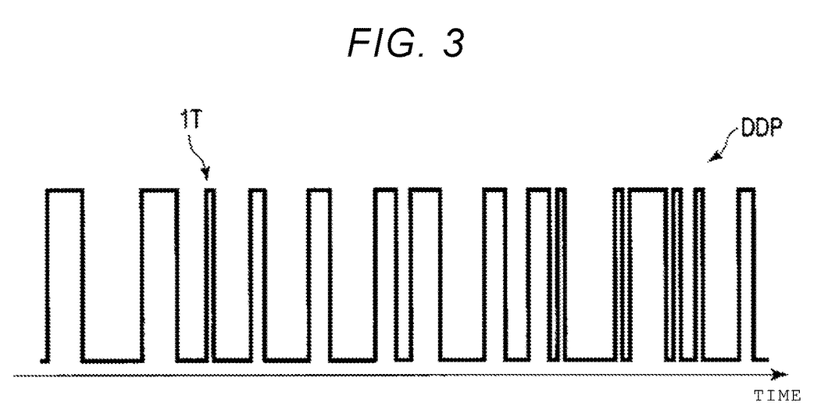
FIG. 3 is a schematic diagram illustrating an example of a data pattern of detection data.

FIG. 2 is a schematic diagram illustrating an example of a data pattern of normal data, and FIG. 3 is a schematic diagram illustrating an example of a data pattern of detection data. In FIG. 2 and FIG. 3, the horizontal axis is time. FIG. 2 illustrates a data pattern NDP of normal data. FIG. 3 illustrates the data pattern DDP of the detection data.

In the example illustrated in FIG. 2, the data pattern NDP randomly contains a high frequency data pattern (hereinafter, referred to as a high frequency pattern) having a magnetization inversion interval smaller than that of the low frequency pattern, for example, a 1T data pattern and a low frequency pattern, for example, a data pattern having a larger magnetization inversion interval than 1T. Thus, an average magnetization inversion interval of the detection data is larger than an average magnetization inversion interval of the normal data.

In the example illustrated in FIG. 3, the data pattern DDP contains a lot of low frequency patterns, for example, data patterns generally having a larger magnetization inversion interval than the 1T inversion intervals included in NDP.

Figure 4:
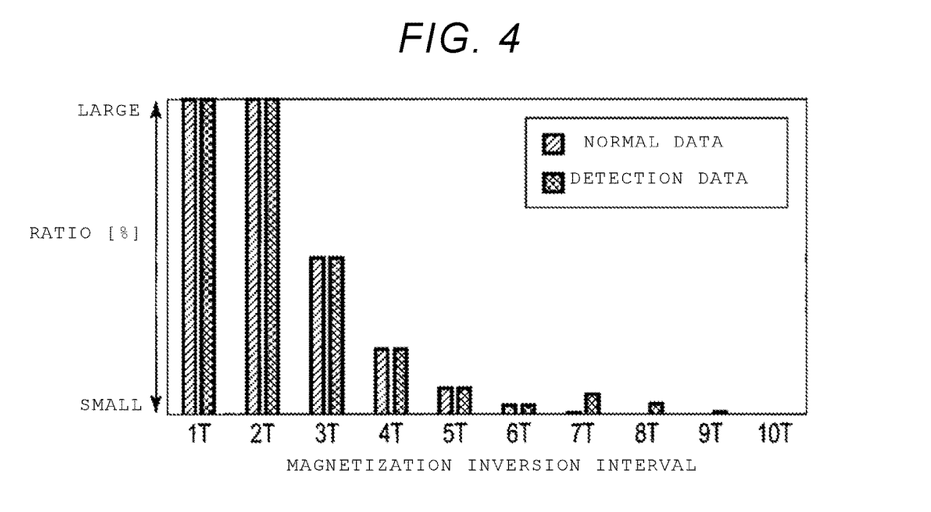
FIG. 4 is a diagram illustrating an example of a ratio of data patterns of magnetization inversion intervals to all data patterns in normal data and detection data.

FIG. 4 is a diagram illustrating an example of a ratio of data patterns of magnetization inversion intervals with respect to all data patterns in normal data and detection data. In FIG. 4, the vertical axis represents the ratio of the data pattern of each magnetization inversion interval with respect to all data patterns, and the horizontal axis represents the magnetization inversion interval of the data patterns. In FIG. 4, the hatched bar graph illustrates an example of a data pattern of each magnetization inversion interval included in the normal data, and the meshed bar graph illustrates an example of a data pattern of each magnetization inversion interval included in the detection data.

As illustrated in FIG. 4, the ratio of the low frequency patterns with respect to all data patterns of the detection data is larger than the ratio of the low frequency patterns with respect to all data patterns of the normal data. In the example illustrated in FIG. 4, the ratio of low-frequency data patterns (for example, 7T, 8T, and 9T) of the detection data is larger than the ratio of the low-frequency data patterns (for example, 7T, 8T, and 9T) of the normal data. In one example, the ratio of the low-frequency data patterns (for example 6T to 10T) of the normal data is less than or equal to 1% with respect to all data patterns of the normal data. By contrast, the ratio of the low-frequency data patterns (for example, 6T to 10T) of the detection data is greater than or equal to 3% with respect to all data patterns of the detection data.

Figure 5:
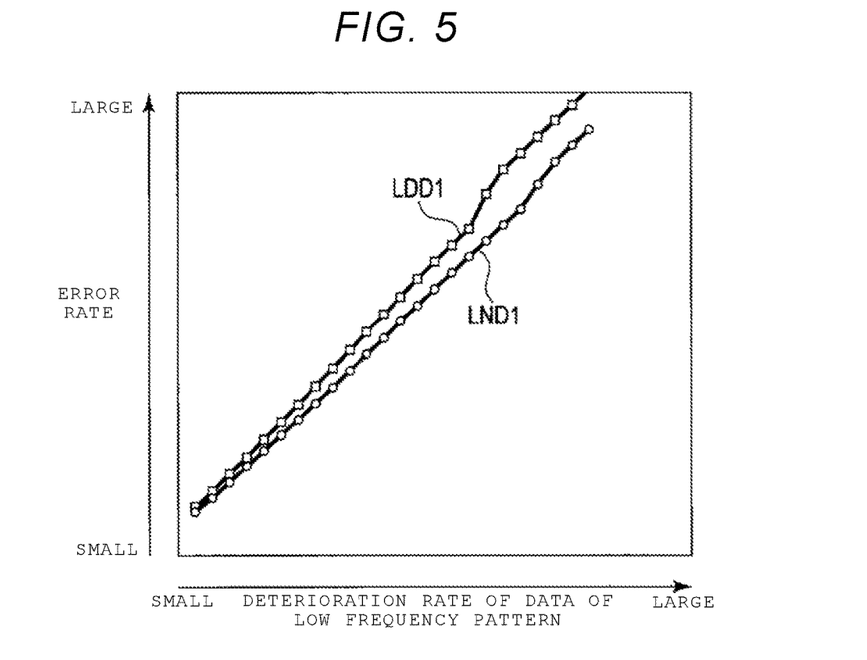
FIG. 5 is a diagram illustrating an example of a relationship between a deterioration rate of a low frequency pattern and an error rate.

FIG. 5 is a diagram illustrating an example of a relationship between a deterioration rate of low-frequency patterns and an error rate. FIG. 5 illustrates change LDD1 of an error rate of detection data that has been read (hereinafter, simply referred to as an error rate of detection data) with respect to a deterioration rate (attenuation rate) of data of the low-frequency pattern of the detection data, and change LND1 of an error rate of normal data that has been read (hereinafter, simply referred to as an error rate of normal data) with respect to the deterioration rate of data of the low-frequency pattern in the normal data.

In FIG. 5, the change LDD1 of the error rate of detection data and the change LND1 of the error rate of normal data both increase as the deterioration rate of the low-frequency pattern increases. In FIG. 5, the error rate of detection data increases more quickly than the error rate of the normal data with respect to the deterioration rate of data of the low-frequency pattern. In a thermal fluctuation environment, where data having the low-frequency pattern easily deteriorates, in a high temperature environment, the error rate of detection data increases more quickly than the error rate of the normal data. Thus, the error rate of detection data can be measured more easily than the error rate of normal data. As illustrated in FIG. 5, a general trend of the change LDD1 of the error rate of detection data and that of the change LND1 of the error rate of normal data are substantially the same. For that reason, in an environment where data having low-frequency patterns easily deteriorates, the error rate of detection data is detected so prediction of the error rate of normal data is facilitated. That is, the error rate of normal data is predicted based on the error rate of detection data.

When the detection data is read, the detection unit 63 measures signal quality of the read detection data. In a case where signal quality of detection data significantly deteriorates, for example, deteriorates to be equal to or greater than a predetermined threshold value related to the signal quality, the detection unit 63 converts a value of the deterioration in signal quality of the detection data into a value of the deterioration in signal quality of the normal data in the thermal fluctuation environment. The detection unit 63 outputs the converted value of the deterioration in signal quality of the normal data to the refresh control unit 65.

For example, when detection data is read and it is determined that an amount of change in the error rate of the currently read detection data is equal to or greater than a threshold value (hereinafter, referred to as an error rate threshold value), the detection unit 63 converts the amount of change in the error rate of detection data into the amount of change in the error rate of normal data due to thermal fluctuations (or being in a thermal fluctuation environment). In some embodiments, the amount of change in the error rate of the currently read detection data is with respect to an earlier determined error rate of detection data. The detection unit 63 converts the amount of change in the error rate of detection data into the amount of change in the error rate of normal data based on information (hereinafter, referred to as conversion information) for converting the error rate of detection data into the error rate of normal data due to thermal fluctuations. The detection unit 63 outputs the converted amount of change in the error rate of normal data due to thermal fluctuations to the refresh control unit 65. The detection unit 63 records conversion information in the volatile memory 70, the nonvolatile memory 90, the system area 10b, and/or any other suitable storage device. When a plurality of heads 15 are included in the magnetic disk device 1, the detection unit 63 may hold a plurality of values of the conversion information that each respectively correspond to one of the plurality of heads 15. Hereinafter, for clarity of description, the "signal quality of the detection data or the amount of change (or amount of deterioration) of the error rate of the detection data" is simply referred to as "the change in the error rate of the detection data" and the "amount of change (or amount of deterioration) in the signal quality or error rate of normal data due to thermal fluctuations (or being in a thermal fluctuation environment or high-temperature environment) is simply referred to as "the change in the error rate of normal data".

Figure 6:
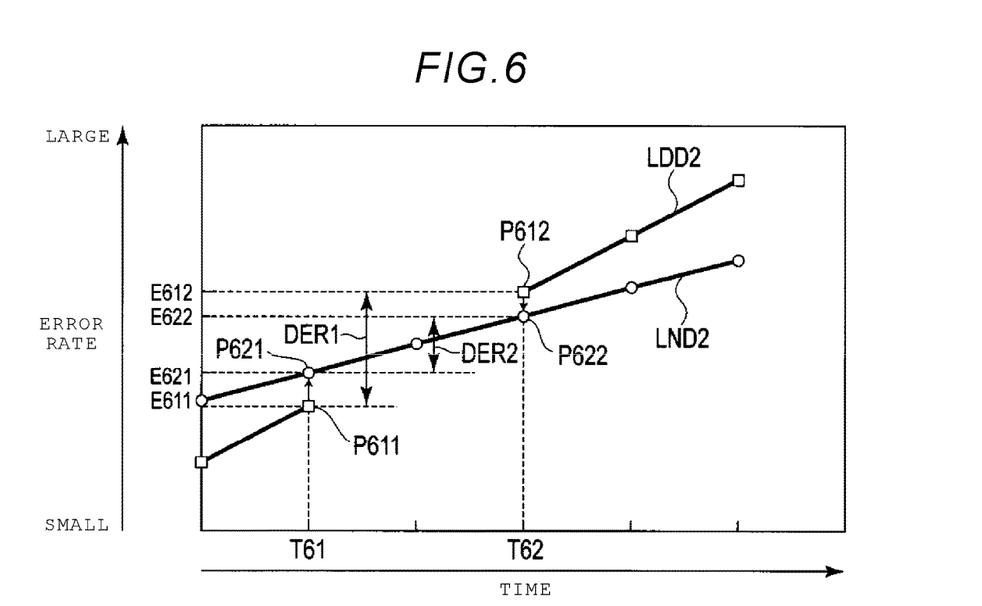
FIG. 6 is a diagram illustrating an example of a relationship between change in error rate of detection data and normal data due to a thermal fluctuation phenomenon.

FIG. 6 is a diagram illustrating an example of the relationship between change in the error rate of detection data and change in the error rate of normal data due to the effects of thermal fluctuations. In FIG. 6, the vertical axis represents the error rate, and the horizontal axis represents the time during which the magnetic disk device 1 is disposed in the thermal fluctuation environment, for example, a high-temperature environment. FIG. 6 illustrates change LDD2 in the error rate of detection data due to thermal fluctuations with respect to time and change LND2 in the error rate of normal data due to thermal fluctuations with respect to time. In FIG. 6, a point P611 indicates an error rate E611 of detection data at a time T61 before the magnetic disk device 1 stops its operation. A point P612 indicates an error rate E612 of detection data at a time T62 when the magnetic disk device 1 is activated. In FIG. 6, the point P611 is the error rate detected at a time before the point P612 is detected. In FIG. 6, a point P621 indicates an error rate E621 of normal data at the time T61, and a point 622 indicates an error rate E622 of normal data at the time T62. The detection unit 63 records information indicating the relationship between change in the error rate of the detection data and the change in the error rate of normal data due to thermal fluctuations as illustrated in FIG. 6. For example, the detection unit can record such information as conversion information in the volatile memory 70, the nonvolatile memory 90, the system area 10b, and/or in any suitable memory location. In FIG. 6, it is assumed that the magnetic disk device 1 is disposed in a high temperature environment, for example, a temperature environment of several tens of degrees above a standard temperature (e.g., several tens of degrees above 20 C.

For example, the detection unit 63 measures the error rate of read detection data at multiple predetermined times. The detection unit 63 generates an amount of change in the error rate of detection data based on the difference between 1) the error rate of detection data read previously and 2) the error rate of detection data which is currently read. The detection unit 63 determines whether the amount of change in the error rate of the detection data is equal to or greater than an error rate threshold value or less than such an error rate threshold value. In the example illustrated in FIG. 6, the detection unit 63 measures the error rate E611 of detection data at the time T61. The detection unit 63 then measures the error rate E612 of detection data at the time T62. The detection unit 63 generates an amount of change DER1 in the error rate of detection data based on the difference between the error rate E611 and the error rate E612. The detection unit 63 then determines whether the generated amount of change DER 1 in the error rate of detection data is equal to or greater than the error rate threshold value or less than the error rate threshold value. In other words, the detection unit 63 determines whether the amount of change DER 1 in the error rate of the detection data is equal to or greater than the error rate threshold value or less than the error rate threshold value. Based on the above determination, the detection unit 63 can determine whether normal data has experienced deterioration to such an extent that normal data cannot be read (leading to a read error) if the normal data further degrades due to thermal fluctuations.

When it is determined that the amount of change DER1 in the error rate of detection data is equal to or greater than the error rate threshold value, that is, when it is determined that the normal data has potentially deteriorated to such an extent that further thermal deterioration of the normal data can cause a read error, the detection unit 63 determines the amount of change DER2 in the error rate of normal data based on the amount of change DER1 in the error rate of detection data into and based on the conversion information as illustrated in FIG. 6. For example, the detection unit 63 determines the error rate E621 of normal data at the time T61 based on the error rate E611 of detection data and on the conversion information as illustrated in FIG. 6. The detection unit 63 further determines the error rate E622 of normal data at the time T62 based on the error rate E612 of detection data and the conversion information as illustrated in FIG. 6. The detection unit 63 generates the amount of change DER2 in the error rate of normal data from the difference between the error rate E621 of normal data and the error rate E622 of normal data. The detection unit 63 outputs the generated amount of change DER2 in the error rate of the normal data to the refresh control unit 65.

On the other hand, when it is determined that the amount of change DER1 in the error rate of detection data is less than the error rate threshold value, that is, when it is determined that the normal data has not deteriorated to such an extent that read errors can occur induces by the thermal fluctuations, the detection unit 63 ends processing. When it is determined that the amount of change DER1 in the error rate of detection data is less than the error rate threshold value, the detection unit 63 may output a signal to the read/write control unit 61 for executing a process of rewriting the detection data to the detection area DA.

The refresh control unit 65 controls a process (a refresh process) that includes temporarily reading data written in a predetermined recording area on the disk 10 and rewriting the read data to the predetermined recording area. For example, the refresh control unit 65 counts the number of times (hereinafter, referred to as a write count) in which data (for example, normal data or detection data) is written to a track of the disk 10 (hereinafter, referred to as "adjacent track") that is radially adjacent to a predetermined track in which normal data is written. The refresh control unit 65 manages the write count of each such predetermined track on which normal data is written by using a table or the like. Based on the amount of change DER2 in the error rate of the normal data (which is input from the detection unit 63) and on information for correcting the write count according to the error rate of the normal data (hereinafter, referred to as correction information), the refresh control unit 65 updates the write count of each track managed by the table. When it is determined that the write count of a predetermined track of the disk 10 is equal to or greater than a threshold value (hereinafter, referred to as a "refresh threshold value"), the refresh control unit 65 executes a refresh process on the predetermined track. The refresh control unit 65 records the table for managing the write count of each track on which the normal data is written as well as the correction information in the volatile memory 70, the nonvolatile memory 90, the system area 10b, and the like. The refresh control unit 65 may count the write count for each zone obtained by dividing the disk 10 into predetermined recording areas along the radial direction and may manage the write count of each zone in which normal data is written by using a table. In this case, for example, the refresh control unit 65 corrects the write count of each zone managed in the table based on the amount of change in the error rate of normal data (which is input from the detection unit 63) and on the correction information. When it is determined that the write count of a predetermined zone in which the normal data is written is equal to or greater than the refresh threshold value, the refresh control unit 65 executes the refresh process on that predetermined zone. When a plurality of heads 15 are included in the magnetic disk device 1, the refresh control unit 65 may store a plurality of correction information values that each respectively correspond to one of the plurality of heads 15.

Figure 7:
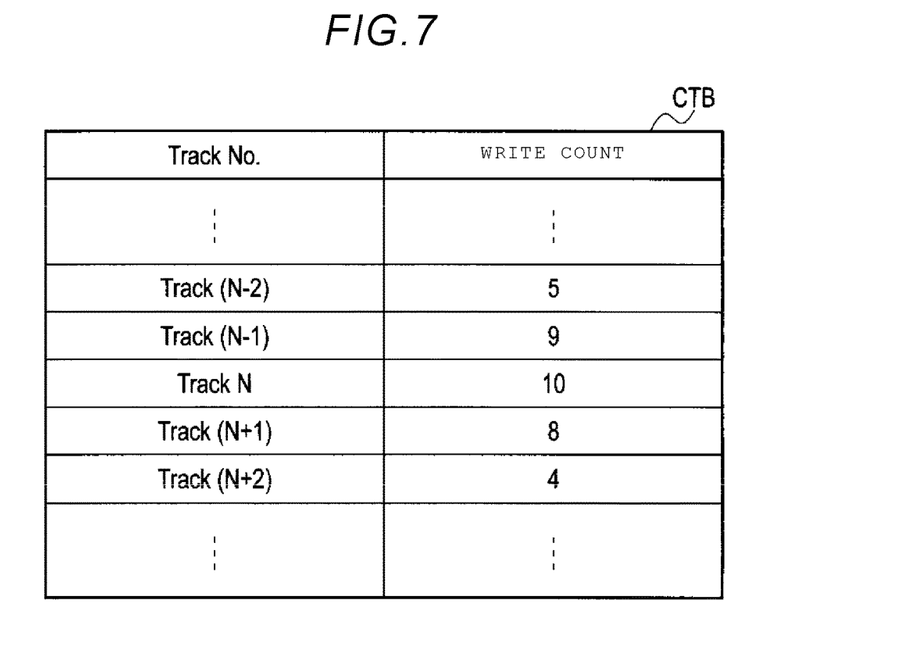
FIG. 7 is a diagram illustrating an example of a table for managing the write count.

FIG. 7 is a diagram illustrating an example of a table CTB used for managing the write count. In FIG. 7, the table CTB contains a Track No of each track in which normal data is written and the write count in accordance with each track. Track No indicates a track number. Track (N−2), Track (N−1), Track N, Track (N+1), and Track (N+2) are arranged continuously along the radial direction of the disk 10. Track (N−2) and Track (N−1) are adjacent to each other in the radial direction of the disk 10. That is, Track (N−2) and Track (N−1) are radially adjacent to each other. Track (N−1) and Track N are adjacent to each other in the radial direction of the disk 10. Track N and Track (N+1) are adjacent to each other in the radial direction of the disk 10. Track (N+1) and Track (N+2) are adjacent to each other in the radial direction of the disk 10. For example, the refresh control unit 65 records the table CTB in the volatile memory 70, the nonvolatile memory 90, the system area 10b, and the like.

For example, when data is written to Track (N−1), the refresh control unit 65 adds 1 to the write count of tracks that are radially adjacent to Track (N−1), i.e., Track N and Track (N−2) of the table CTB. In another example, when data is written to Track (N+1), the refresh control unit 65 adds 1 to the write count of Track N and Track (N+2) of the table CTB. When data is written to Track N, the refresh control unit 65 adds 1 to the write count of Track (N−1) and Track (N+1) of the table CTB. For example, when the write count of the Track N in the table CTB is equal to or greater than the refresh threshold value, the refresh control unit 65 executes the refresh process on Track N of the disk 10 and changes the write count of Track N in the table CTB to 0 (zero).

Figure 8:
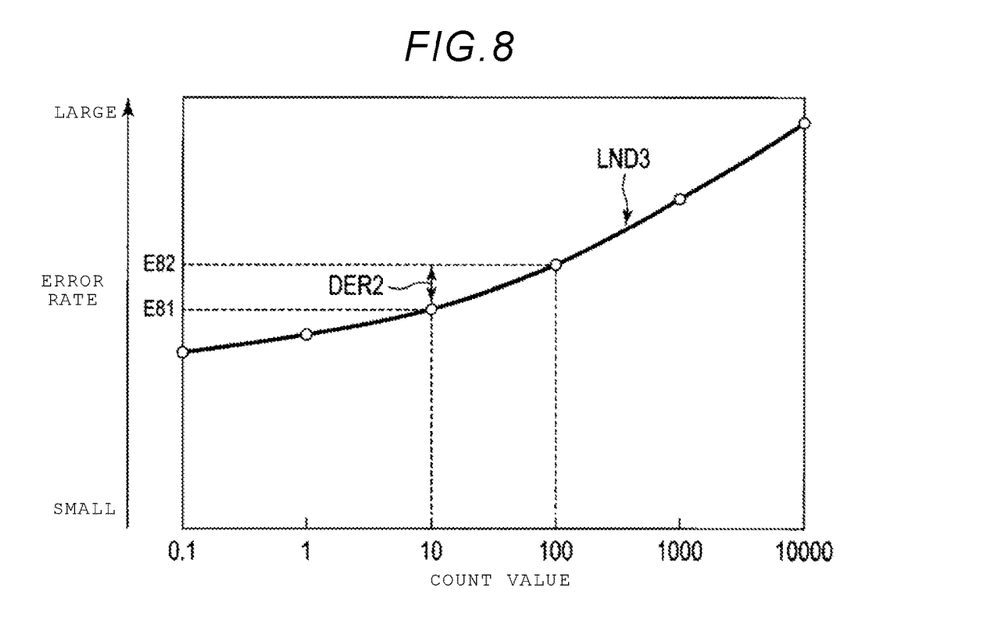
FIG. 8 is a diagram illustrating an example of a relationship between the error rate and the write count of normal data.

FIG. 8 is a diagram illustrating an example of the relationship between the error rate and the write count of normal data. In FIG. 8, the vertical axis illustrates the error rate of normal data and the horizontal axis illustrates the write count of normal data. FIG. 8 illustrates the change LND3 of the error rate of normal data with respect to the write count of the normal data. For example, in some embodiments, the refresh control unit 65 records information indicating the relationship between the error rate and the write count of the normal data, as illustrated in FIG. 8, as correction information. The refresh control unit 65 can records such correction information in the volatile memory 70, the nonvolatile memory 90, the system area 10b, and any other suitable storage location. In FIG. 8, a method of correcting the write count according to the amount of change in the error rate of normal data will be described using Track N illustrated in FIG. 7, but the same correction method can also be applied to other tracks.

Based on the amount of change DER2 in the error rate of normal data (which is input from the detection unit 63) and on the correction information as illustrated in FIG. 8, the refresh control unit 65 modifies the write count (10) of Track N in which the normal data is written (illustrated in FIG. 7) to the write count (100). In the example illustrated in FIG. 8, the refresh control unit 65 measures an error rate E81 in accordance with the write count (10) from the amount of change LND3 of the error rate of normal data with respect to the write count of normal data. The refresh control unit 65 adds the amount of change DER2 in the error rate of normal data to the detected error rate E81 to generate an error rate E82. The refresh control unit 65 measures the write count (100) in accordance with the error rate E82 from the change LND3 of the error rate of normal data with respect to the write count of normal data, and corrects the write count (10) of Track N in the table CTB of FIG. 7 to the write count (100). The refresh control unit 65 determines whether the corrected write count (100) is equal to or greater than the refresh threshold value or less than the refresh threshold value. When it is determined that the corrected write count (100) is equal to or greater than the refresh threshold value, the refresh control unit 65 rewrites (i.e., executes the refresh process) the normal data written in Track N to Track N and changes the write count of Track N of the table CTB of FIGS. 7 to 0 (zero).

Figure 9:
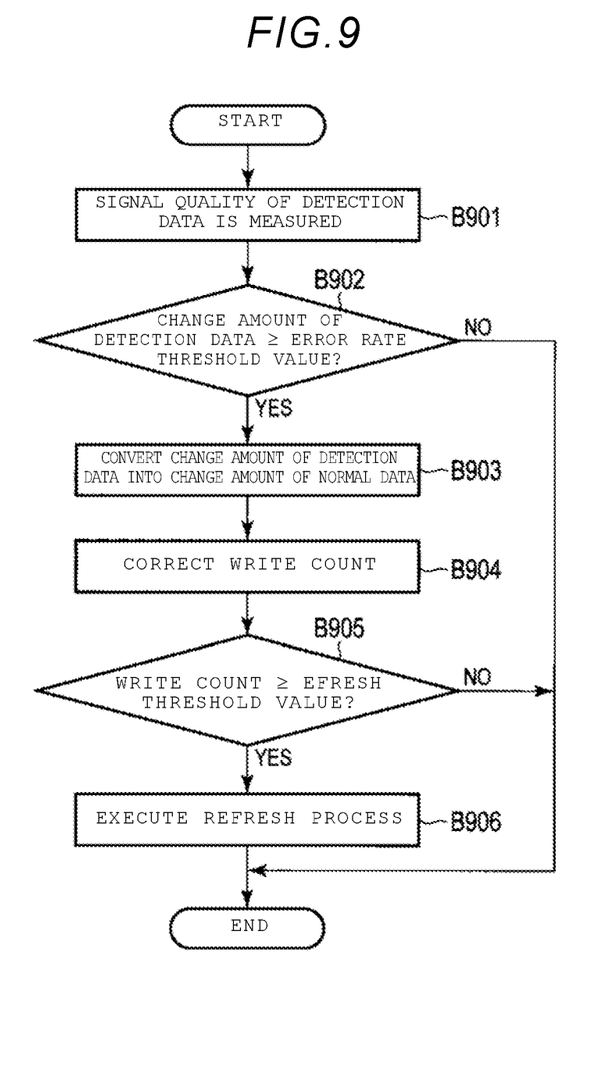
FIG. 9 is a flowchart of an example of a refresh processing method according to the first embodiment.

FIG. 9 is a flowchart of an example of a refresh processing method according to the present embodiment.

When detection data is read, the MPU 60 measures signal quality of the read detection data, for example, an error rate (B901). The MPU 60 determines whether an amount of change in the error rate of the detection data is equal to or greater than an error rate threshold value or less than the error rate threshold value (B902). When it is determined that the amount of change in the error rate in the detection data is less than the error rate threshold value, that is, when it is determined that the normal data has not deteriorated to such an extent that a read error can be caused by thermal fluctuations (NO in B902), the MPU 60 ends the process.

When it is determined that the amount of change in the error rate of the detection data is equal to or greater than the error rate threshold value, that is, when it is determined that the normal data has deteriorated to such an extent that read errors can occur if the normal data further deteriorates due to thermal fluctuations (YES in B902), the MPU 60 converts the amount of change in the error rate of the detection data into an amount of change in the error rate of the normal data, based on conversion information (B903). The MPU 60 updates the write count of each track managed in the table CTB based on the amount of change in error rate of the normal data and on the correction information (B904). The MPU 60 determines whether the write count of a predetermined track among the tracks managed in the table CTB is greater than the refresh threshold value or less than the refresh threshold value (B905). When it is determined that the write count of the predetermined track managed in the table CTB is less than the refresh threshold value (NO in B905), the MPU 60 ends the process. When it is determined that the write count of the predetermined track managed in the table CTB is equal to or greater than the refresh threshold value (YES in B905), the MPU 60 executes the refresh process on the predetermined track (B906), and ends the refresh process. For example, when it is determined that the write count of the predetermined track managed in the table CTB is equal to or greater than the refresh threshold value, the MPU 60 rewrites the normal data written in the predetermined track and sets the write count of the predetermined track of the table CTB to 0, and ends the process.

According to the first embodiment, the magnetic disk device 1 reads detection data written in the detection area DA at predetermined times. When the detection data is read, the magnetic disk device 1 measures signal quality of the detection data and determines whether the detection data is significantly changed or not significantly changed. When it is determined that signal quality of the detection data is significantly changed, the magnetic disk device 1 determines that the normal data has likely deteriorated to such an extent that a read error can occur if the normal data further deteriorates due to thermal fluctuations or other exposure to elevated temperatures. That is, the magnetic disk device 1 measures signal quality of the detection data to facilitate detection of deterioration of the normal data. When it is determined that the normal data has likely deteriorated to such an extent that a read error can occur if the normal data further deteriorates due to thermal fluctuations, the magnetic disk device 1 converts the amount of deterioration of the detected data into the amount of deterioration of the normal data based on conversion information. In addition, the magnetic disk device 1 corrects the write count of each track managed by the table CTB, based on the converted amount of deterioration of the normal data and the correction information. When the write count of a predetermined track managed in the table CTB is equal to or greater than the refresh threshold value, the magnetic disk device 1 rewrites the normal data written in the predetermined track. Accordingly, the magnetic disk device 1 can perform the refresh process on the predetermined track before normal data written in the predetermined track has deteriorated to the point that a read error can occur. As described above, the magnetic disk device 1 measures only the signal quality of the detection data without measuring signal quality of all normal data written in the disk 10, and thus it is possible to easily and efficiently detect deterioration of the normal data due to exposure of the magnetic disk device 1 to thermal fluctuations. Thus, the magnetic disk device 1 can rewrite the normal data before the read error is caused. For that reason, the magnetic disk device 1 can improve reliability of data stored by the magnetic disk device 1.

Next, a magnetic disk device according to a first modification of the first embodiment will be described. In the first modification of the first embodiment, the same reference numerals are given to the same parts as those in the first embodiment described above, and a detailed description thereof will be omitted.

First Modification of the First Embodiment

The magnetic disk device 1 of the first modification of the first embodiment is different from the first embodiment in the timing of reading detection data.

Figure 10:
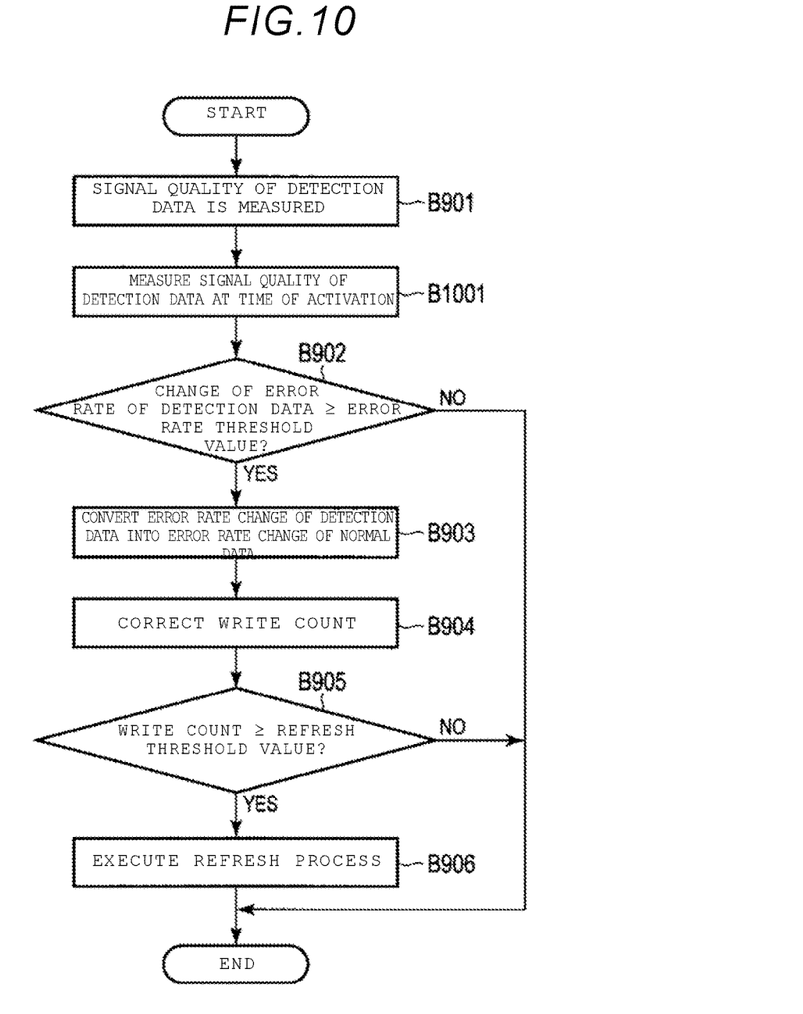
FIG. 10 is a flowchart of an example of a refresh processing method according to a first modification of the first embodiment.

FIG. 10 is a flowchart of an example of a refresh processing method according to the first modification of the first embodiment.

When detection data is read, the MPU 60 measures signal quality of the read detection data, for example, an error rate (B901). The MPU 60 reads the detection data at a time of re-activation (i.e., power up after a non-normal shut-down, unexpected loss of power etc.), measures signal quality of the read detection data (B1001), and proceeds to the process in B902.

According to Modification example 1, the magnetic disk device 1 reads the detection data at the time of re-activation of the magnetic disk device 1 after power is unexpectedly shut down (and/or after some other non-normal shut-down of the magnetic disk device 1), and measures signal quality of the read detection data. For that reason, even when power of the magnetic disk device 1 is shut down and left in a thermal fluctuation environment, the magnetic disk device 1 can easily detect deterioration of normal data due to thermal fluctuations and can rewrite the normal data before a read error is caused. For that reason, the magnetic disk device 1 can improve reliability of data.

Second Modification of the First Embodiment

In the second modification of the first embodiment, a configuration of a detection area DA of the magnetic disk device 1 is different from that of the first embodiment described above.

Figure 11:
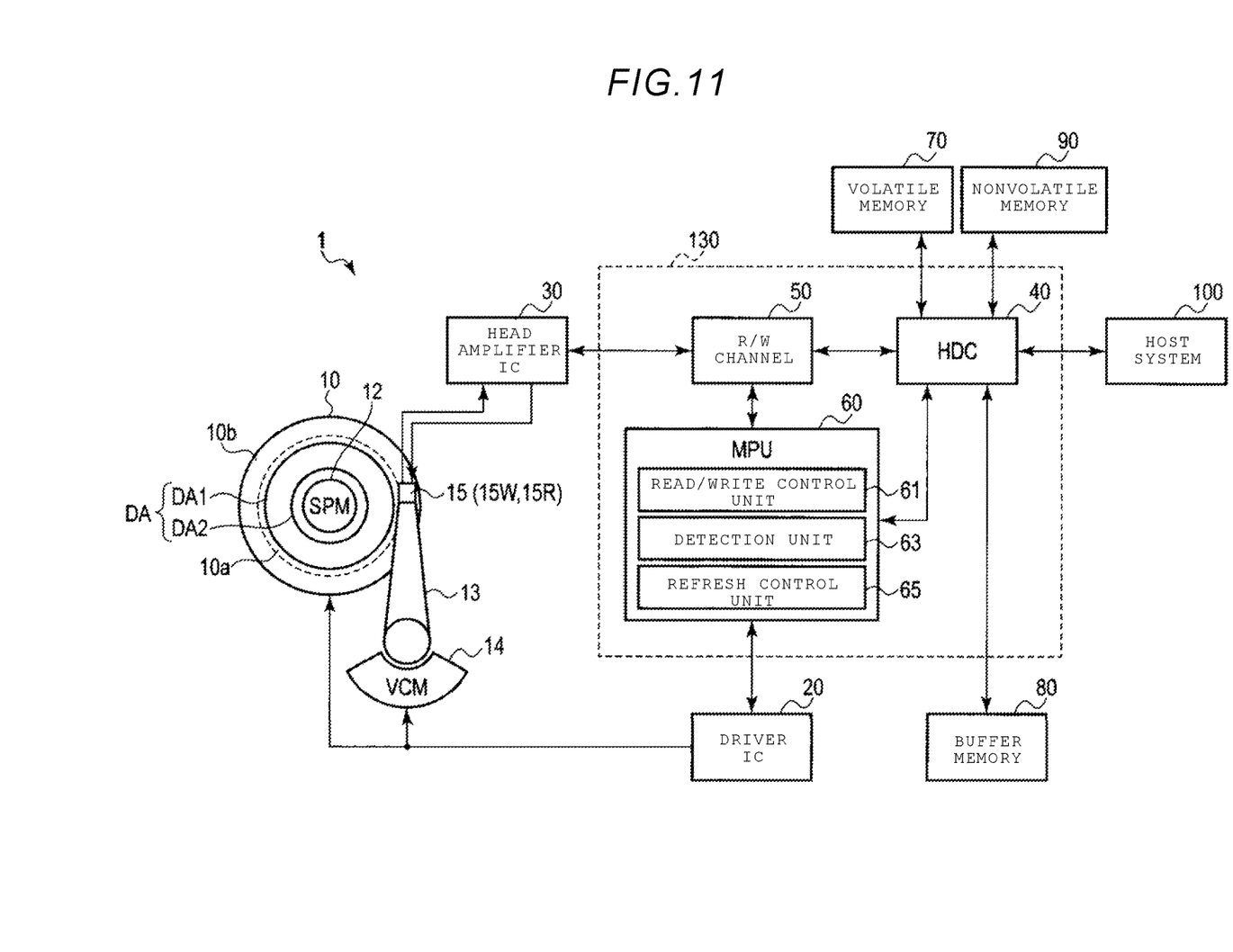
FIG. 11 is a block diagram illustrating a configuration of a magnetic disk device according to a second modification of the first embodiment.

FIG. 11 is a block diagram illustrating a configuration of the magnetic disk device 1 according to the second modification of the first embodiment.

In the example illustrated in FIG. 11, the user data area 10*a* includes the detection area DA. The detection area DA includes the detection areas DA1 and DA2. For example, in some embodiments, detection data is written in each of the detection areas DA1 and DA2. Alternatively, the detection areas DA1 and DA2 may be disposed in the system area 10*b*. Alternatively, one of the detection areas DA1 and DA2 may be disposed in the user data area 10*a* and the other detection area may be disposed in the system area 10*b*. Furthermore, in some embodiments, the detection area DA may include three or more detection areas.

According to the second modification of the first embodiment, the magnetic disk device 1 has a disk 10 that includes one of the plurality of detection areas DA1 and DA2 described above. Since each of the plurality of detection areas DA1 and DA2 is located at a different radial location on the disk 10, the magnetic disk device 1 can detect deterioration of normal data due to the variable influence of thermal fluctuations across the radial direction of the disk 10. For example, an outer diameter region of the disk 10 may be affected more or sooner by thermal fluctuations than an inner diameter region of the disk 10. For that reason, the magnetic disk device 1 can improve reliability detect that normal data have started to deteriorate and, as a result, the storage of data in the magnetic disk device 1 is more reliable.

Third Modification of the First Embodiment

The magnetic disk device 1 of the third modification of the first embodiment is different from the embodiment described above in how the write count is counted.

Figure 12:
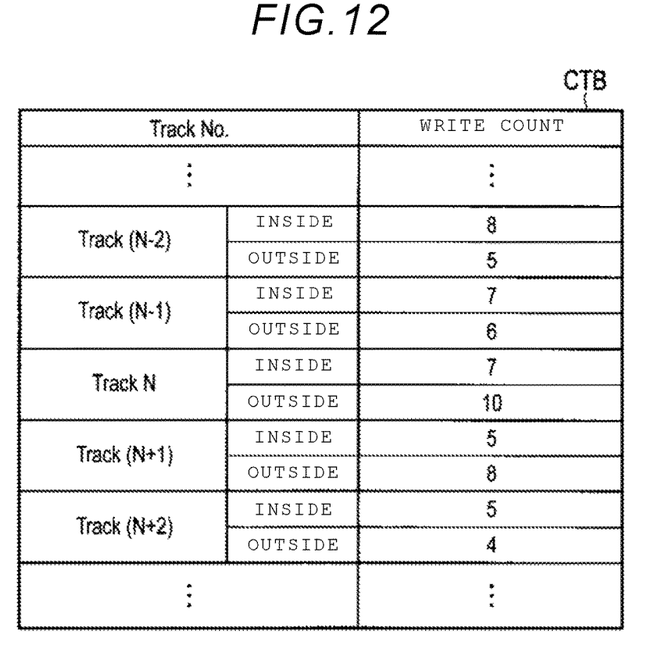
FIG. 12 is a diagram illustrating an example of a table for managing the write count according to a third modification of the first embodiment.

FIG. 12 is a diagram illustrating an example of a table CTB used for managing the write count according to the third modification of the first embodiment. In FIG. 12, the write count includes a write count (hereinafter, referred to as an "outer side write count") in which data (for example, normal data and detection data) are written in adjacent tracks positioned outside the corresponding track and a write count (hereinafter, referred to as an "inner side write count") in which data is written in adjacent tracks positioned inside the corresponding track. In FIG. 12, Track (N−2), Track (N−1), Track N, Track (N+1), and Track (N+2) are arranged continuously from an inside (or inner diameter) region to an outside (or outer diameter) region in the radial direction of the disk 10.

For example, when data is written into Track (N−1), the refresh control unit 65 adds 1 to the inner side write count of Track N and the outer side write count of the Track (N−2) of the table CTB. In another example, when data is written into Track (N+1), the refresh control unit 65 adds 1 to the outer side write count of Track N and the inner side write count of Track (N+2) of the table CTB. In another example, when data is written into Track N, the refresh control unit 65 adds 1 to the outer side write count of Track (N−1) and the inner side write count of Track (N+1) of the table CTB. The refresh control unit 65 considers the greater of the inner side write count and the outer side write count as the write count of each track.

According to the third modification of the first embodiment, the magnetic disk device 1 counts the outer side write count and the inner side write count of each track managed in the table CTB, respectively. As such, by counting the outer side write count and the inner side write count of each track managed in the table CTB, respectively, the magnetic disk device 1 can improve accuracy of the refresh process.

Second Embodiment

In the magnetic disk device 1 of a second embodiment, signal processing in the case of detecting signal quality is different from the first embodiment described above.

Figure 13:
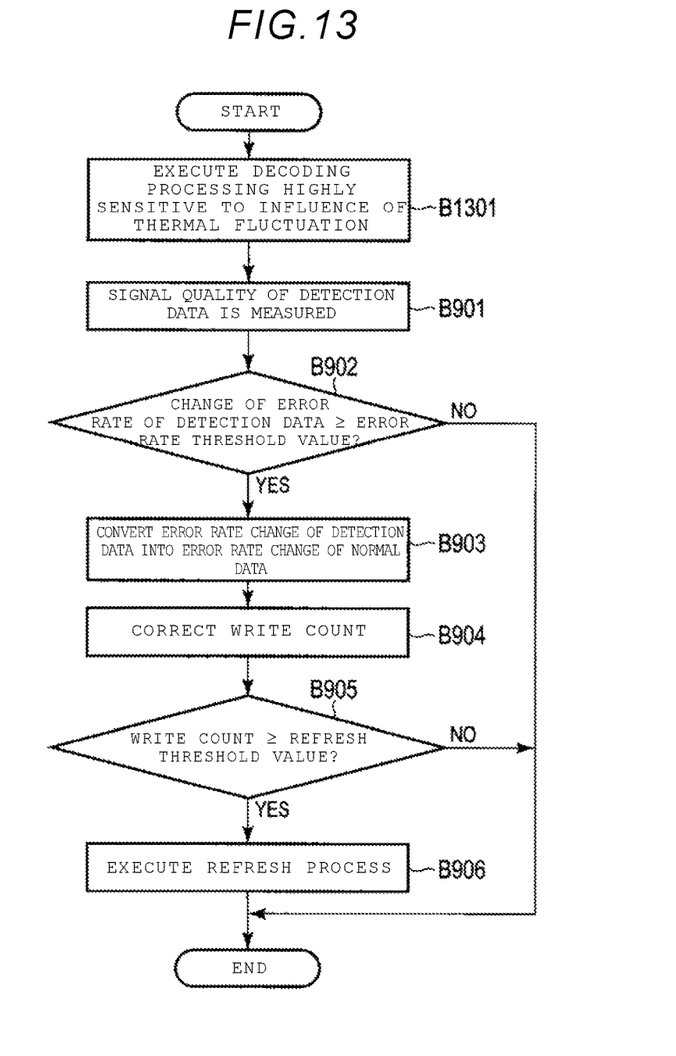
FIG. 13 is a flowchart of an example of a refresh processing method according to a second embodiment.

FIG. 13 is a flowchart of an example of a refresh process according to the second embodiment.

When detection data is read, the MPU 60 executes decoding processing highly sensitive with respect to the influence of the thermal fluctuation phenomenon, and proceeds to process in B901. For example, when the detection data is read, the MPU 60 executes decoding processing in which the partial response target is changed to a value that is highly sensitive with respect to the influence of thermal fluctuations. For instance, when the normal data is read, the MPU 60 sets the partial response target to [4 7 0 −1] or [4 7 0 −4], or when the detection data is read, the MPU 60 sets the partial response target to [4 7 1] or [4 7 0].

According to the second embodiment, the magnetic disk device 1 executes decoding processing highly sensitive with respect to the influence of thermal fluctuations. The magnetic disk device 1 measures only the signal quality of the detection data without measuring signal quality of all normal data written in the disk 10 and thus, it is possible to easily detect deterioration of the normal data due to thermal fluctuations. Thus, the magnetic disk device 1 can rewrite the normal data before a read error is caused by deterioration due to exposure to thermal fluctuations. Accordingly, the magnetic disk device 1 can improve reliability of data.

In the second embodiment, the detection data may have the same data pattern as that of the normal data. In other words, the detection data may randomly include, for example, data patterns of various magnetization inversion intervals. The disk 10 may not include the detection area DA. When the disk 10 does not include the detection area DA, the detection data may be written in a predetermined recording area of at least one of the user data area 10a and the system area 10b. As such, even when the detection data includes similar data patterns to that of the normal data, the magnetic disk device 1 can detect deterioration of the normal data due to thermal fluctuations by executing the decoding processing that is highly sensitive with respect to the influence of thermal fluctuations.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification example as would fall within the scope and spirit of the inventions.

What is claimed is:

1. A magnetic disk device comprising:
   a disk;
   a head that writes data to the disk and reads data from the disk; and
   a controller configured to:
     control the head to read first data written on the disk;
     measure a first read error rate of the first data;
     determine a first difference in the first read error rate from a previously determined read error rate of the first data;
     based on the first difference in the first read error rate from the previously determined read error rate, determine a second difference between current and previous read error rates for second data written on the disk; and
     based on the determined second difference, determine whether a refresh process is to be performed on the second data.

2. The magnetic disk device of claim 1, wherein the controller is configured to determine whether the refresh process is to be performed on the second data by determining whether a write count of each track of the disk updated based on the determined second difference is equal to or more than a threshold value.

3. The magnetic disk device of claim 1, wherein the second data are stored in a first portion of a user data area of the disk and the controller is further configured to perform the refresh process on the second data by re-writing the second data in the first portion of the user data area.

4. The magnetic disk device of claim 1, wherein the second data are stored in a user data area of the disk and the first data are stored in a system area of the disk.

5. The magnetic disk device of claim 1, wherein the second data has an average magnetization inversion interval that is larger than an average magnetization inversion interval of the first data.

* * * * *